Figure 1:
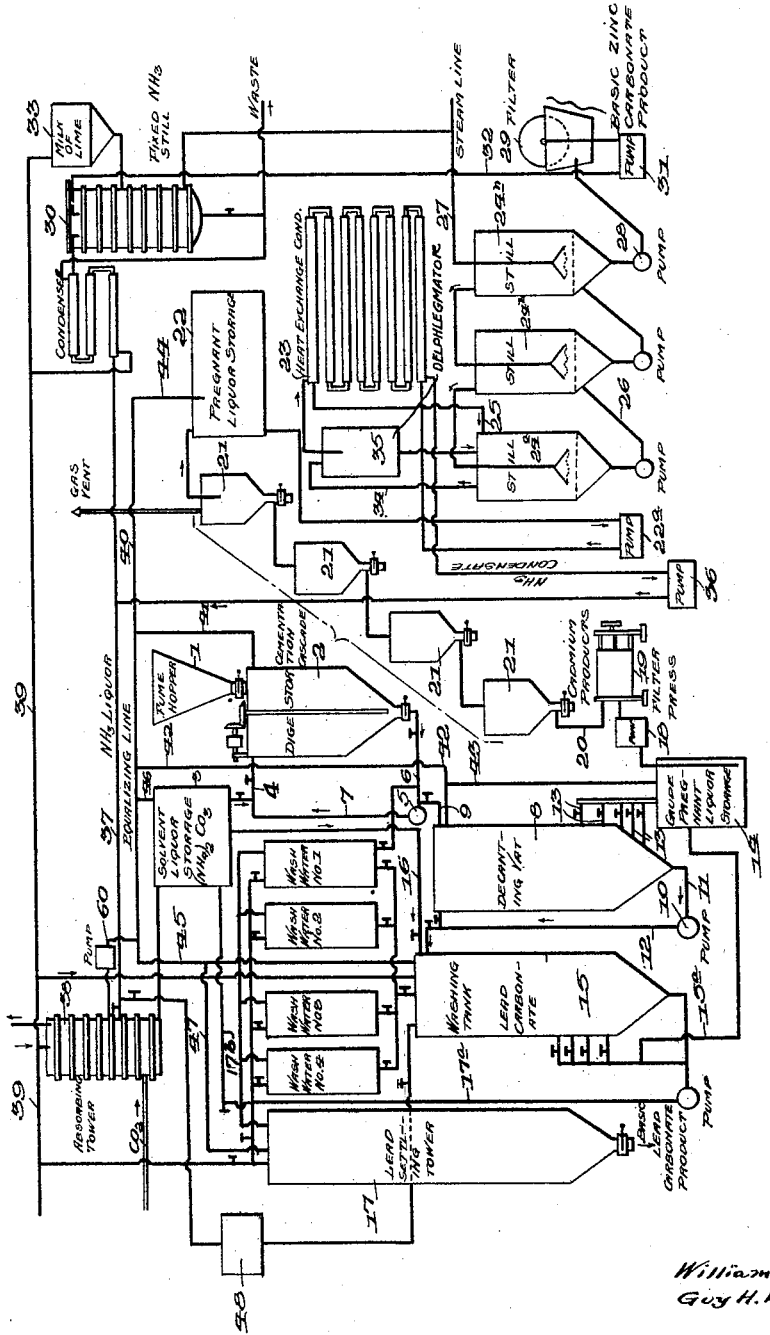

Patented Sept. 27, 1932

1,879,834

UNITED STATES PATENT OFFICE

WILLIAM GEORGE WARING, OF WEBB CITY, AND GUY HULL WARING, OF ORONOGO, MISSOURI

PROCESS OF REFINING ZINCIFEROUS MATERIAL

Application filed October 13, 1928. Serial No. 312,357.

This invention relates to processes of refining zinciferous fume; and it comprises a process of recovering the various metallic values from certain types of zinciferous fume with the aid of ammonium carbonate solutions wherein such fume is digested with the solution under slightly reduced pressure and the extracts obtained treated by certain methodical procedures to obtain lead, cadmium, zinc and other metals, all of these operations being under slightly reduced pressure, and to recover ammonium carbonate reentering the cycle; all as more fully hereinafter set forth and as claimed.

In the treatment of various complex zinc ores in fume furnaces, a fume is recovered carrying a number of metallic values in addition to zinc. In treating one common complex zinc ore by the process of G. H. Waring Patent 1,652,224, the recovered fume carries zinc as oxid, lead as a more or less basic sulfate and cadmium as a more or less basic sulfate. Similar ores may give fumes containing antimony oxids, copper oxids, bismuth oxysulfate, oxids of germanium, thallium, gallium, molybdenum, arsenic, etc. One advantageous way of treating fumes of this type is disclosed in the patent to W. G. Waring No. 1,430,271. This process utilizes the solvent power of ammonium carbonate solutions.

Ammonium carbonate is a fairly definite salt of carbonic acid and ammonia. Its solution is considerably less alkaline than one containing a corresponding amount of free ammonia ($NH_3$) and its solvent powers are quite different; a fact utilized in the process of said patent to W. G. Waring, No. 1,430,271. Carbonic acid is however a weak acid and ammonia is not a very strong base, so that ammonium carbonate in solution is considerably hydrolyzed. For some purposes, it may be regarded as containing coexisting free acid and free base in equilibrium. In aqueous solutions $CO_2$, as such, is less soluble than $NH_3$ and the use of reduced pressure tends to disturb this equilibrium, with a corresponding change in solvent power.

In a prior application, Serial No. 136,315, filed September 18, 1926, whereof the present application is in part a continuation, we have described and claimed a method of utilizing ammonium carbonate solution in the general process of the patent of W. G. Waring 1,430,271, utilizing the facts just noted with regard to the properties of ammonium carbonate solution. We have found that by effecting digestion of the fume under reduced pressure, we can effect an advantageous modification of the solvent power of the ammonium carbonate solution by increasing its capacity for dissolving cadmium. The proportion of $CO_2$ to $NH_3$ in the solution under reduced pressure is less than in ordinary or commercial ammonium carbonate solution, and we have found that if such a solution is used in the digesting step the cadmium is more completely dissolved from the precipitated lead carbonate, resulting in a better separation of these constituents. By using reduced pressure throughout the system, we are also enabled to work with less loss of ammonia; with a more efficient recovery of the reagent. The $CO_2$ is also kept within the system.

In the process of that application, there is a detailed procedure used in treating a fume and a certain organization of apparatus elements; both more fully set forth hereinafter. In the process as there described, the first step is the digestion of the fume with ammonium carbonate solution under reduced pressure, but at a low temperature. This takes cadmium and zinc into solution and leaves the lead undissolved as a carbonate. Lead sulfate is converted into lead carbonate, with formation of a corresponding amount of ammonium sulfate. Afterwards, the solution containing cadmium and zinc is treated in certain ways hereinafter set forth.

This is an advantageous way of working and we hereinafter describe and claim it. But we have found that the solution produced on digestion is, so to speak, unstable with respect to the dissolved cadmium salt and that, under certain conditions, it loses the cadmium which then remains with the lead carbonate.

Basic sulfate of cadmium as it occurs in the fume is decomposed by water; some of the cadmium going into solution as normal sulfate and some remaining undissolved as oxid.

In a few instances, more than half of the cadmium dissolves. On treating a fume containing cadmium with ammonium carbonate solution, all the cadmium dissolves, none remaining behind with the lead carbonate. The cadmium solution, however, is not stable, as already stated, and if it be allowed to stand for a while, all the cadmium comes out again and settles with the lead carbonate. This is a crystallization action and is accelerated by the presence of the lead carbonate. Acceleration is greater, if there is present pre-existing crystalline cadmium carbonate. In the presence of a seed crystal of cadmium carbonate, the cadmium comes out of solution very quickly. The operator, in using ammonium carbonate for digesting this type of fume, has his choice of two alternative ways of procedure; one such procedure being that of the acknowledged copending prior application, Serial No. 136,315, and the other being where the solution formed on the initial digestion of the zinc fume with ammonium carbonate solution under reduced pressure is allowed to stand for a time and seeded with cadmium carbonate from a previous operation. Cadmium carbonate deposits in admixture with lead carbonate. In a third alternative way, the digestion liquor can be withdrawn quickly from the lead carbonate, seeded with cadmium carbonate to deposit the cadmium and then withdrawn to recover zinc and such valuable byproduct metal values as may be present.

Figure 2:
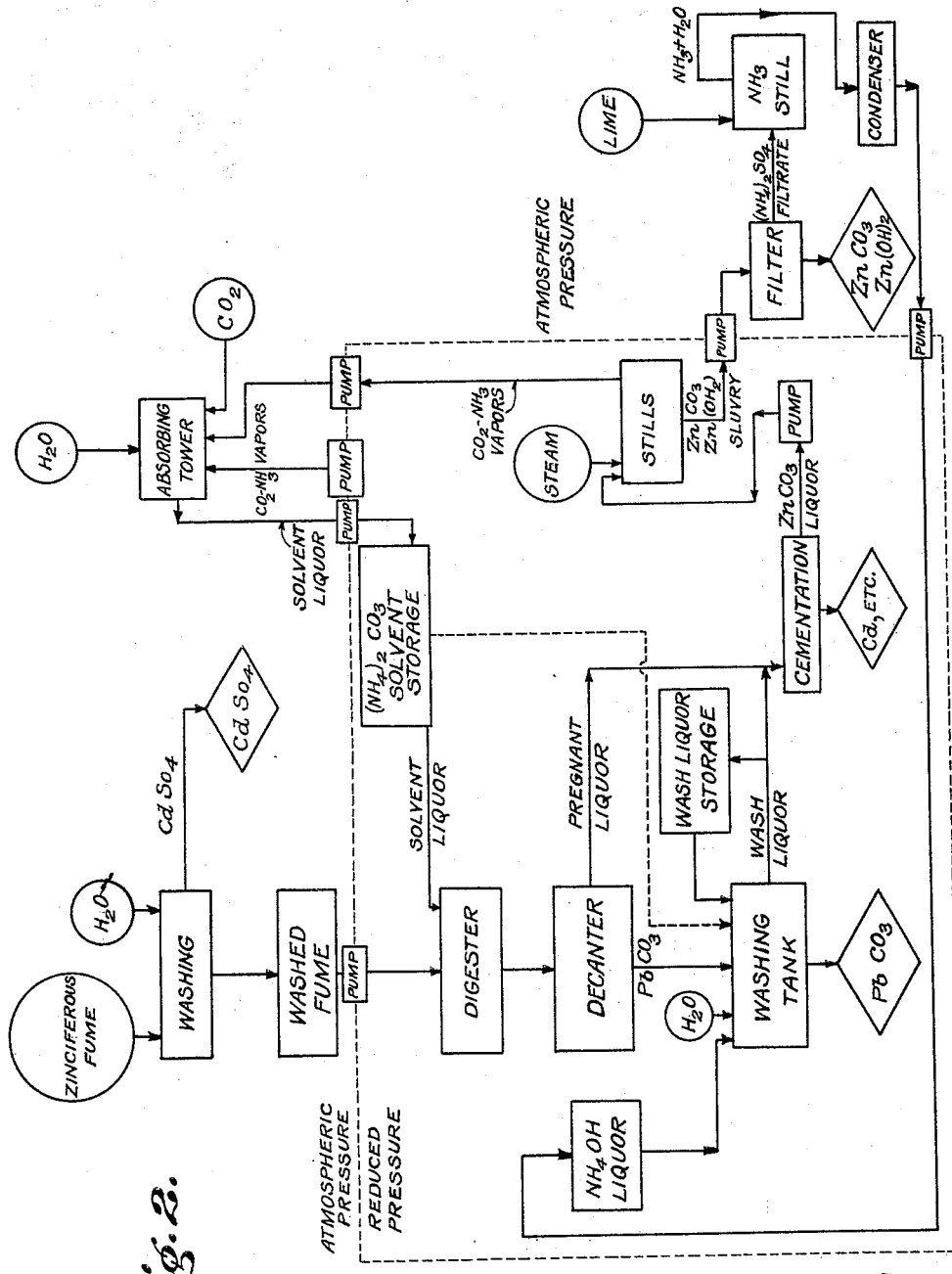

Using the first alternative, which is the matter of application, Serial No. 136,315 as filed, the fume is digested with ammonium carbonate solution in the cold, say, at 50°–80° F. under reduced pressure. Suction equivalent to 0.5 to 1.5 inches of mercury may be used. The lead is converted into carbonate and remains undissolved, while cadmium and zinc go into solution. The solution is subjected to a methodical treatment in a way best explained by the accompanying drawings which represent, in a diagrammatical way, the flow of materials through the system. In this showing:

Fig. 1 represents a flow sheet upon which there is indicated, diagrammatically, the complete equipment required for conducting the process of our invention, while Fig. 2 is a simplified flow sheet which is largely self interpreting, showing the entry of the raw materials into and the exist of the finished product from the process.

Referring to Fig. 1, zinciferous fume may be first washed with water or ammonia water. It then enters the digester 2 through the feed hopper 1. A definite amount of ammonium carbonate solution, depending upon the amount of zinc and cadmium and other solubles to be disolved is introduced into the digester from the solvent storage tank 3 by line 4. In the digester, the mixture of fume and solvent is agitated for about an hour or until all of the zinc, cadmium and other metals soluble in ammonium carbonate are dissolved and lead is converted into insoluble carbonate. During the digestion, in order to obtain a more thorough incorporation of the solvent with the fume and thereby facilitate solution of the soluble materials, the charge in the digester is circulated by means of pump 5 through pipes 6 and 7. The churning effect, due to the circulation through pump 5, materially shortens the time required for dissolving the soluble matter in the fume. After the digestion period is completed, the contents of the digester or digesters, if more than one is used, are discharged into a decanting vat 8, by means of pipe 9. At least one pair of decanting vats is required for each working shift. Each decanting vat is provided with a circulating arrangement comprising pump 10 and pipes 11 and 12 whereby the material in the decanting vat is circulated continuously until the decanting vat is filled. The mixture in the vat is now permitted to settle by suspending the circulation. Basic lead carbonate and other insoluble matters settle, leaving a clear supernatant solution, which is withdrawn by means of pipes 13 into a storage tank 14. The lead sediment is pumped into a washing tank 15. Fresh solvent solution from tank 3 is admitted by pipe 16 to the washing tank and acts to prevent hydrolysis and to remove a proportionate amount of the entrained zinc and cadmium remaining in the lead carbonate in the washing tank. After this preliminary washing has been completed and the mixture allowed to settle, the clear supernatant solution is conducted back to storage tank 3 through lines 17a and 17b, or to a special vat (not shown) and subsequently used as solvent in the digester charges.

After the preliminary washing with solvent liquor, washing is continued with the effluent wash waters resulting from washing preceding batches of basic lead carbonate produced in the process. The basic lead carbonate is first washed with the second wash water used in the preceding wash operation, the first wash water in said preceding operation having been sent to tank 14. This supply of wash water is maintained in wash water storage vat No. 1, as shown. The effluent from this first washing is conducted to vat 14 by line 15a. The lead carbonate is then washed with the third wash water of the preceding wash operation, said wash water being maintained until ready for use in wash tank No. 2. The effluent from this second washing is conducted by line 17a to wash water tank No. 1, to later become the first wash water for the next succeeding batch. The carbonate is again washed for a short time with the fourth wash water of the preceding wash operation, said wash water being maintained until ready for use in wash water tank No. 3 and the effluent from this third washing operation is conducted by line 17a to wash water tank No. 2 and becomes the second wash water for the next succeeding batch. The fourth or final wash is made with ammonia water from vat 48 and with plain water, alternately, and the effluent therefrom goes into wash water tanks 3 or 4 to become in turn the third or fourth wash water for use in succeeding batches, until sufficiently concentrated in cadmium to be sent to the cementation cascade. It has been shown in practice that the foregoing procedure, while the process is not limited thereto is highly desirable if the best results are to be obtained. The preliminary wash with solvent liquor may, however, not be necessary in rare cases where the fume contains very little lead. The number of washings required may also vary somewhat. The basic lead carbonate is finally pumped into settling tower 17 by line 17a, whence it is discharged as a thick putty-like mass containing only 15 to 25 per cent of moisture and capable of being easily dried.

The crude ammoniacal zinc and cadmium liquors (or "pregnant liquors", as they are called in the art), consisting of those drawn directly from decanting vat 8 together with the enriched washings obtained from the washing of the basic lead carbonate, are passed through a pump 18 and filtered in filter 19 to remove insoluble material which may have been carried over in the decanting process. Leaving the filter 19, the solution passes by pipe 20 into the cementation cascade comprising pots 21 filled with scraps of metallic zinc, upon which the cadmium contained in the liquors is precipitated as a fine heavy black sludge, together with small amounts of silver, copper, germanium, thallium, selenium and other elements more electronegative than zinc. Arsenic, however, all escapes as gaseous hydrid through the vent pipes of the upper cascade pot 21 and is carried into a furnace (not shown), where it is collected as metallic arsenic or as arsenious oxid, as may be desired. The liquor, now containing only zinc in solution, is passed into a storage tank 22, and thence aided by pump 22a through countercurrent heat exchanging apparatus 23, wherein it absorbs a large amount of heat from the effluent steam and gases leaving stills 24, to and into said stills, entering by pipe 25. By preliminarily heating the liquor prior to distillation, much of the foaming common to prior processes is done away with. The stills 24 are cylindrical in form, having conical bottoms and are provided with proper inlet and outlet pipes as schematically indicated in the drawing. The principle of multiple effect evaporation is used. In 24a the preheated liquor is brought into contact with hot ammoniacal vapors and live steam from still 24b. The liquor passes by line 26 from still 24a into still 24b, wherein it is again brought into contact with hot ammoniacal vapors and live steam from still 24n. In this way, the hot vapors produced in later effects act to cause expulsion of all the free ammonia and carbon dioxid content of the zinc liquor as it passes through the stills in countercurrent relation to the hot vapors. In the stills, the hot vapors are brought into direct contact with the ammoniacal liquor to be distilled. Only three stills have been shown but about ten stills are preferable for continuous operation including continuous discharge of effluent and precipitate. As a result, the ammoniacal liquor loses its free ammonia and remaining carbon dioxid, while its zinc content is gradually precipitated as a very finely divided crystalline basic carbonate of lower $CO_2$ content than that precipitated by the ordinary methods of evaporation. The precipitate obtained in this process contains about 13 per cent $CO_2$, as against 19 per cent $CO_2$ in the product of prior processes. The precipitate is very light and remains suspended in the liquor, instead of partly precipitating upon the walls of the stills and pipes as a scale. All of the zinc is precipitated before the liquor carrying the basic carbonate in suspension reaches the last still, which is heated by live steam received directly from a steam generator through pipe 27. From the last still, the effluent water and basic carbonate are drawn out continuously by pump 28 and delivered to a filter 29, which is shown as a continuous rotary filter but which may be an ordinary plate and frame filter press. A carbonate having the composition $(ZnCO_3.2Zn(OH)_2)$ is obtained on the filter.

If the zinciferous fume contains a notable proportion of sulfate or chlorid, the effluent liquid will still contain an equivalent proportion of fixed ammonia as sulfate or chlorid. The ammonia so bound, if not recovered, is a direct loss. In order to recover such ammonia, I have provided a fixed ammonia still 30 of ordinary construction, into which the filtrate from filter 29 is pumped by pump 31 and line 32. In the fixed ammonia still the filtrate is brought into contact with milk of lime from a storage tank 33 and the fixed ammonia content of the liquor is liberated, volatilized, condensed and, in part, subsequently united with the ammoniacal liquor coming from stills 24 by way of the heat exchanger 23, the remainder going into storage vat 48.

The vapors generated in the stills 24 issue finally from still 24a by pipe 34 and are conducted to dephlegmator 35 and then through the countercurrent preheater 23 already referred to and in which the ammoniacal vapors act to preheat incoming ammoniacal zinc solution, and the vapors are condensed therein. The condensate leaving 23, still under reduced pressure, is drawn through pump 36 which serves the double purpose of producing a vacuum in the still and of delivering the condensate, under a moderate positive pressure, by pipes 37 to the carbonating tower 38 into which a regulated stream of carbon dioxid is admitted, under moderate pressure, for the purpose of regenerating ammonium carbonate for reuse in the digester 2. Fresh water is allowed to trickle through pipe 39 into the top of the carbonating tower in order to dilute the concentrated ammonium carbonate solution to the proper density for use and to absorb any remaining small quantities of ammonia gas and carbon dioxid.

All of the apparatus, with the exception of the stills, is maintained under subatmospheric pressure by means of an equalizing pipe 40 connected to digester 2 by line 41, decanting vat 8 by line 42, storage tank 14 by line 43, storage tank 22 by line 44, wash tank 15 by line 45, solvent tank 3 by line 46 and settling tower 17 by line 47. Suction is maintained in line 40 by pump 60 communicating therewith on its suction side and on its pressure side delivering withdrawn gases and vapors into absorbing tower 38 where ammonium carbonate solution is regenerated. A pressure below atmospheric is maintained in the digesters and tanks, whereby loss of ammonia, common to prior processes, is avoided. The amount of suction required is regulated by the amount of back pressure exerted by the column of liquid in 38, which back pressure it may exceed by 0.5 to 1.5 inches of mercury, as stated.

The above outlined process can be more easily followed by referring to Fig. 2. In this figure the entry, exit and flow of all materials are clearly indicated. The materials entering the process are indicated in the circles and the finished products leaving the process are shown in the diamond shaped areas. The apparatus employed, such as the digester, decanter etc. are indicated in the oblong areas. With this explanation, the flow sheet becomes self-interpreting.

In the case of fume containing considerable cadmium, it is advisable to give it a preliminary leaching with pure ammoniated water before the treatment with solvent liquor. The cadmium exists in fume chiefly as cadmium oxysulfate, easily soluble in weakly ammoniated water, while the zinc exists as oxid, and is almost wholly insoluble in weakly ammoniated water. The ammoniated water leaching is carried out in apparatus (not shown) similar to that used for digesting and decantation, lettered 2 and 8 in the drawings. Only the settled sludge is then charged into 2 along with the solvent liquor.

The process may be applied to other volatilized oxidation products of fume smelting of zinciferous materials, e. g., flue, trail and cyclone dust, and fume precipitates of Cottrell or spray treaters.

The $CO_2$ and $NH_3$ withdrawn from the system both go via trunk line 40 through the pump 60 to the tower for reproduction of ammonium carbonate.

In the process as just described the most of the cadmium goes forward with the pregnant liquor resulting from the digestion step. That which remains in the lead carbonate residues is substantially all recovered by the subsequent washing with ammonium carbonate liquor, water and ammonia water. The latter is especially effective in removing cadmium from the lead carbonate residues. The cadmium is recovered in the cementation step together with any copper, silver, or other metals less electro-positive than zinc.

It has been found that if the liquors used in the digestion step are left in contact with the lead carbonate residues for any length of time there is a tendency for the cadmium to precipitate with the lead as carbonate. This precipitation can be greatly accelerated by seeding the solution with crystals of the cadmium carbonate.

On account of the fact that filtration of the pregnant liquors is difficult due to the formation of colloids, I prefer to decant the pregnant liquor, as well as the wash liquors from the lead carbonate residues. For efficient decantation, however, it is necessary to allow a substantial time, sometimes as long as 12 hours, for the lead carbonate suspension to settle. During this period there is a substantial precipitation of the cadmium as carbonate. Much of this cadmium was lost in prior art processes.

The tendency of the cadmium to precipitate upon standing can be taken advantage of in separating this constituent from the solutions. Thus, (1) I may seed the pregnant liquor with cadmium carbonate while in contact with the lead carbonate residues, causing the substantially complete precipitation of the cadmium as cadmium carbonate with the lead residues. The cadmium can then be extracted from the latter by the use of ammonia water, in which the cadmium carbonate is readily soluble. The ammoniacal solution of cadmium so obtained is of substantial purity and is stable. This solution can be cemented with zinc to recover a pure grade of cadmium. (2) I may decant the pregnant liquor quickly from the residues and seed the liquor, allowing the cadmium carbonate to precipitate and to be recovered by filtration, for example.

When the separation of cadmium is not considered important, due to its small content in the ore, for example, I usually proceed as outlined previously, part of the cadmium being retained in the pregnant liquor and part of it being recovered from the lead carbonate residues by washing with ammonia liquor, etc. In this case the cadmium is recovered from the process in the cementation cascade, as mentioned previously.

In reconstituting ammonium carbonate solution with $NH^3$ and $CO^2$, it is advantageous to work under atmospheric pressure or higher. In the illustration, it will be noted that all elements form a closed system, with the elements where the fume is extracted and where the several values are removed from the pregnant solution all in communication with the suction side of a pump or compressor delivering on its pressure side into the means for reconstituting ammonium carbonate. Any desired subatmospheric pressure can be maintained on the one side with atmospheric pressure, or higher, on the other side. In most of the system, any leakage occurring will be inward and no loss of ammonia or creation of nuisance need be feared. The use of reduced pressure, while important for chemical reasons, as stated, is also highly advantageous for this reason also: that it assists in the conservation of ammonia.

Some of the ores used in making the fume contain traces of germanium and this passes into the fume. The amount is extremely small, being about 0.008 per cent in certain western ores, but it is worth recovering. In the present process, it is extracted from the fume and passes forward and is precipitated as metal with the cadmium by the zinc. Under some conditions, however, some is not thrown down but goes forward with escaping hydrogen as $GeH_4$. This can be broken up and metal recovered by heating the tube carrying the gases. It comes down as a metallic deposit together with arsenic, if any be present.

What we claim is:

1. In the process of recovering lead, zinc and cadmium values from zinciferous fume or like material, the step which comprises digesting said fume under subatmospheric pressure with ammonium carbonate solution.

2. In the ammonium carbonate process of recovering metallic values from zinciferous fume or like material, the step which comprises washing the insoluble residues resulting from the ammonium carbonate digestion with ammonia water to dissolve cadmium values therefrom.

3. In the recovery of lead, cadmium and zinc values from zinciferous fume or like material, the process which comprises preliminarily washing said fume with ammonia water to remove soluble constituents, digesting the washed fume with ammonium carbonate solution under reduced pressure, separating the insoluble lead containing residues from the liquor, progressively washing the said residues with solvent liquor, effluents from preceding washings, and finally with ammonia water, uniting at least part of said washings with the ammonium carbonate liquor containing the major zinc values, recovering metals electronegative to zinc, including cadmium, from said liquor and finaly recovering zinc values therefrom.

In testimony whereof, we have hereunto affixed our signatures.

WILLIAM GEORGE WARING.
GUY HULL WARING.